United States Patent [19]

Ohashi et al.

[11] 4,256,799
[45] Mar. 17, 1981

[54] FIREPROOF LAMINATES

[75] Inventors: Takashi Ohashi, Iruma; Toru Okuyama, Sagamihara; Akira Suzuki, Hidaka, all of Japan

[73] Assignee: Bridgestone Tire Co., Ltd., Tokyo, Japan

[21] Appl. No.: 68,290

[22] Filed: Aug. 20, 1979

[30] Foreign Application Priority Data

Aug. 18, 1978 [JP] Japan .................... 53/100776

[51] Int. Cl.³ .................................................. B32B 5/20
[52] U.S. Cl. ........................... 428/215; 428/313; 428/444; 428/920; 428/921
[58] Field of Search ............... 521/125, 902; 428/310, 428/313, 315, 920, 921, 213, 214, 215, 443, 444

[56] References Cited

U.S. PATENT DOCUMENTS

| | | | |
|---|---|---|---|
| 2,151,024 | 3/1939 | Gilbert | 428/444 |
| 3,814,659 | 6/1974 | Nadeau | 428/313 |
| 3,940,517 | 2/1976 | De Leon | 521/902 |
| 4,054,710 | 10/1977 | Botsolas | 428/317 |
| 4,067,833 | 1/1978 | Austin et al. | 521/902 |
| 4,073,997 | 2/1978 | Richards et al. | 428/313 |
| 4,118,533 | 10/1978 | Hipchen et al. | 428/313 |
| 4,121,958 | 10/1978 | Koonts | 428/314 |
| 4,189,541 | 2/1980 | Ohashi et al. | 521/902 |
| 4,205,136 | 5/1980 | Ohashi et al. | 428/315 |

FOREIGN PATENT DOCUMENTS

| | | | |
|---|---|---|---|
| 2253890 | 7/1975 | France | 428/313 |
| 2007590 | 5/1979 | United Kingdom | 428/313 |

*Primary Examiner*—William J. Van Balen
*Attorney, Agent, or Firm*—Sughrue, Rothwell, Mion, Zinn and Macpeak

[57] ABSTRACT

A fireproof laminate passing Grade 2 incombustibility according to Japanese Industrial Standard (JIS) A-1321 combustion test is disclosed. The laminate comprises a urethane modified polyisocyanurate foam as a core material and particular surface materials piled on both sides of the foam through self-adhesion of the foam and has a density of the core material of 0.02–0.04 g/cm³ and a total thickness of not more than 30 mm.

17 Claims, 1 Drawing Figure

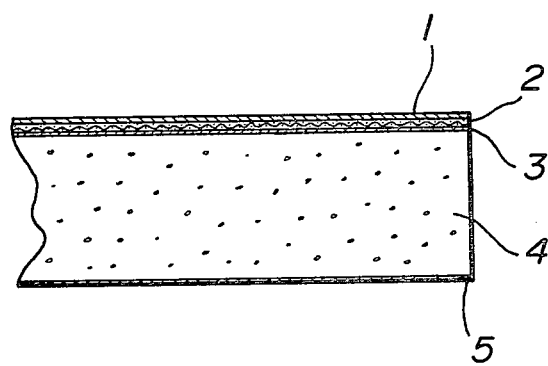

FIREPROOF LAMINATES

This invention relates to novel fireproof laminates using a urethane modified polyisocyanurate foam as a core material. More particularly, it relates to fireproof laminates having excellent fireproof property and low-smoke development, which are obtained by using the above core material having a defined density and a front surface material having a three-layer structure composed of an asbestos paper as an upper layer, a glass fiber as a middle layer and a metal foil as a lower layer as a surface material for at least one side of the core material and piling them one upon another at a total thickness of a defined range through self-adhesion of the urethane modified polyisocyanurate foam.

The fireproof laminates according to the invention are characterized by having a fireproof property passed Grade 2 incombustibility (quasi-incombustible material) in a test for incombustibility of internal finish materials for buildings according to Japanese Industrial Standard (JIS) A-1321.

Recently, demands for weight-saving, easiness of processability, thermal insulating property and the like in building materials are promptly elevated with the high rising and assembling of buildings. Furthermore, flameproofing regulation for the building materials becomes strengthened with the increase of dangers in the firing. Moreover, the use of quasi-incombustible materials is not only obligated in given sections of detached house, multiple dwelling house and the like by the building regulation, but also abruptly increases in other sections.

As the building materials such as ceiling material, wall material and others, there have hitherto been used ones obtained by using woody part, gypsum or the like as a core material and piling a decorative paper, iron plate or other surface material on a side thereof through an adhesive. However, such building materials are large in the specific gravity and heavy in the weight even in the case of using then as quasi-incombustible material, so that they have such drawbacks that the processability is poor, the thermal insulating property is low, the hygroscopicity is large and the dimensional stability changes considerably with time.

Lately, there have been proposed building materials manufactured by using as a substrate a foamable resin for rigid polyurethane foam, polyisocyanurate foam or the like, which are advantageous in the thermal insulating property and weight-saving, admixing or filling the foamable resin layer with a great amount of a flame retardant, a smoke-suppressing agent, inorganic granules or the like, and laminating the foam as a core material with a relatively thick and heavy steel plate such as colored iron plate and the like as a surface material, a few of which are known as a so-called incombustible building panel. However, it can be said that these panels are unsuitable in the weight-saving and easiness of processability. On the other hand, according to JIS A-1321 "Testing method for incombustibility of internal finish material and procedure of buildings" in the recently revised building regulation, the laminates each composed of the core material and the surface material for use in the ceiling material, wall material and the like are subjected to annexed test and smoke test for toxicity of combustion gases under severe conditions as well as the conventional surface test in order to examine whether or not they pass Grade 2 incombustibility (as quasi-incombustible material). As a result, the extreme restriction for the thickness of the laminate may be required even in the case of using the above mentioned panels in order to pass the laminate through the annexed test. Therefore, these panels can hardly be said to be favorable as the building material having a good thermal insulating property.

Under the above circumstances, the inventors have made various studies with respect to the development of building materials having a light weight, a good thermal insulating property and a fireproof property of Grade 2 incombustibility and as a result, there has previously been proposed a method of producing modified polyisocyanurate foams having a fireproof property of Grade 2 incombustibility (U.S. patent application No. 917,238 filed June 20, 1978 now U.S. Pat. No. 4,189,541, Japanese patent application publication No. 35,400/77). However, the modified polyisocyanurate foams obtained by this method themselves are light-weight and has an excellent thermal insulating property, but are insufficient in the appearance, strength and dimensional stability at moisture absorption for direct use in the building material. Now, the inventors have further made various studies with respect to laminates obtained by using the above modified polyisocyanurate foam as a core material, piling a light-weight decorative paper, sheet or film of plastics such as vinyl chloride resin and the like, mineral paper such as asbestos paper and the like, or an aluminum foil as a surface material on the core material through self-adhesion of the modified polyisocyanurate foam. However, when using the decorative paper, plastic sheet or film as the surface material, the resulting laminate is not only unacceptable as the quasi-incombustible material because the fireproof property of the surface material is considerably poor, but also insufficient in the adhesive property between the core material and the surface material, the dimensional stability and the like. On the other hand, when the asbestos paper having a grade of quasi-incombustibility is used as the surface material, if the laminate composed of the foam core and the asbestos paper is subjected to the combustion test, significant cracks are formed in the asbestos paper by the decomposition gases generated from the foam and as a result, the surface of the core material is directly exposed to a fire source to cause phenomena such as increase of fuming quantity, enlargement of lingering flame and the like, so that the grater part of the laminates becomes unacceptable for Grade 2 incombustibility. Further, the asbestos paper is poor in the moisture resistance and flatness, so that the self-adhesion of the core material to the surface material is poor and hence the density of the core material increases with the decrease of fluidity of foam forming composition during the laminating and also the dimensional change at moisture absorption is large and the thermal insulating property is low. Moreover, the deformation of the laminate and the like are caused due to insufficient rigidity of the asbestos paper.

Further, when using the aluminum foil as the surface material, if the thickness of the foil is not less than 0.1 mm, the laminates satisfying the requirements as the building material can be obtained as mentioned by the inventors in Japanese patent application No. 135,614/77, but they are not yet satisfactory in the appearance and the like as an internal finish material. If the thickness of the foil is less than 0.1 mm, flame easily passes through the surface material, so that the resulting laminate becomes unacceptable for Grade 2 incombustibility.

With the foregoings in mind, the inventors have made further investigations with respect to the fireproof laminates and as a result, the invention has been accomplished. That is, the invention is to provide novel fireproof laminates useful as the building material, which are light weight and rich in the processability and have an excellent appearance as an internal finish material, a good thermal insulating property and a fireproof property of Grade 2 incombustibility according to JIS A-1321 combustion test.

According to the invention, there is provided a fireproof laminate comprising a urethane modified polyisocyanurate foam as a core material and surface materials piled on both sides of the foam, which comprises:

(a) using a three-layer assembly composed of an asbestos paper as an upper layer, a matted or woven glass fiber as a middle layer and a metal foil having a thickness of less than 0.1 mm as a lower layer as a front surface material for said core material, said front surface material being united with said core material through said metal foil by self-adhesion of said foam;

(b) using an aluminum foil having a thickness of not more than 0.1 mm as a back surface material for said core material;

(c) having a denisty of said core material within a range of 0.02-0.04 g/cm$^3$; and (d) having a total thickness of not more than 30 mm.

According to the invention, it makes possible to provide fireproof laminates having a very light weight and excellent thermal insulating property, processability, appearance and the like, which are useful as the building material, by using a three-layer assembly composed of an asbestos paper as an upper layer, a matted or woven glass fiber as a middle layer and a metal foil of less than 0.1 mm thickness as a lower layer, which is lighter in weight than the steel plate usually used, as the front surface material to be piled on the urethane modified polyisocyanurate foam having a low density and an excellent thermal insulating property as the core material.

Further, the rigidity of the surface material itself is improved, so that the resistance to deformation of the surface material is considerably improved. Moreover, by uniting the surface material with the core material through the metal foil, there are solved all of phenomena such as the degradation of adhesive property between the core material and the surface material, which is a serious problem when using only the asbestos paper as the surface material, the increase of the density of the core material accompanied with the decrease of the fluidity of foam forming composition, the dimensional change of the laminate at moisture absorption, the decrease of the thermal insulating property and the like and further combustion characteristics such as smoke development, time of lingering flame and the like according to JIS A-1321 combustion test are considerably improved. The feature that the laminates passing Grade 2 incombustibility (as quasi-incombustible material) are obtained even at the defined total thickness in a range of sufficiently sustaining the thermal insulating property is never anticipated from the prior art and is epoch-making evidently.

According to the invention, it is essential that the density of the urethane modified polyisocyanurate foam used as the core material is within a range of 0.02-0.04 g/cm$^3$. When the density is less than 0.02 g/cm$^3$, the friability of the core material becomes larger and the self-adhesive property to the surface material, dimensional stability and strength lower, so that the resulting laminates become impossible to be ready for practical use. On the other hand, when the density exceeds 0.04 g/cm$^3$, the fuming quantity increases in the annexed test according to JIS A-1321 combustion test, so that the smoke development of the laminate can not reach to the standard value passing Grade 2 incombustibility.

Further, the laminate according to the invention is essential to have a total thickness of not more than 30 mm. When the total thickness exceeds 30 mm, the increase of fuming quantity, enlargement of lingering flame and the like are caused, whereby the laminate becomes impossible to pass Grade 2 incombustibility according to JIS A-1321 combustion test.

The urethane modified polyisocyanurate foam to be used as the core material is produced by polymerizing and foaming an organic polyisocyanate with a polyol in the presence of a blowing agent, an isocyanate polymerization catalyst and if necessary, a surfactant, a modifying agent and other additives.

The organic polyisocyanate to be used in the invention means an organic compound having two or more isocyanate groups in its molecule and includes aliphatic polyisocyanates, aromatic polyisocyanates, mixtures and modified substances thereof. As the aliphatic polyisocyanate, mention may be made of hexamethylene diisocyanate, isophorone diisocyanate, dicyclohexylmethane diisocyanate, methylcyclohexane diisocyanate and the like. As the aromatic polyisocyanate, mention may be made of tolylene diisocyanate (2,4- and/or 2,6-isomers), diphenylmethane diisocyanate, bitolylene diisocyanate, naphthalene diisocyanate (e.g., 1,5-naphthalene diisocyanate), triphenylmethane triisocyanate, dianisidine diisocyanate, xylylene diisocyanate, tris-(isocyanate phenyl) thiophosphate, polynuclear polyisocyanate having the following formula

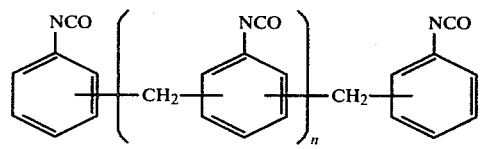

wherein n is 0 or an integer of 1 or more (so-called crude MDI or polymeric isocyanate) obtained by reacting a low polycondensate of aniline and formaldehyde with phosgene, undistilled tolylene diisocyanate and the like. Further, prepolymers having two or more isocyanate groups, which are obtained by any conventional method, for example, prepolymers having an urethane group, a biuret group, an isocyanurate group, a carbodiimide group, an oxazolidone group or the like may be used. These polyisocyanates may be used along or in admixture of two or more polyisocyanates. As the organic polyisocyanate, the aromatic polyisocyanates, particularly polynuclear aromatic polyisocyanates are preferable in view of flameproofing and thermal insulating property.

The polyols to be used in the invention are compounds each having two or more hydroxyl groups at its terminal, which may be used alone or in admixture of two or more compounds. As the polyol, mention may be made of polyhydric alcohols such as ethylene glycol, propylene glycol, butylene glycol, hexylene glycol, diethylene glycol, dipropylene glycol, glycerin, hexane triol, pentaerythritol, trimethylol propane, methyl glucoside, sorbitol, sucrose and the like and/or addition products with an alkylene oxide thereof; an addition product of a polyamine such as ammonia, ethylene diamine, diethylene triamine, tolylene diamine or the like with an alkylene oxide; a phosphorous containing polyol such as an addition product of phosphoric acid with an alkylene oxide and the like; an addition product of a phenol such as bisphenol A or the like with an alkylene oxide; an addition product of an intermediate having a phenolic hydroxyl group such as novolac resin, resol resin or the like with an alkylene oxide and so on.

The object of the invention can be achieved even by using any molecular weight of the polyol and any equivalent ratio of the polyol to the organic polyisocyanate, but a preferable result can be obtained by defining the molecular weight and equivalent ratio to the following ranges. That is, it is preferable to use the polyol having a hydroxyl equivalent of 30-2000, preferably 50-1000 as the molecular weight and a urethane modifying ratio of 0.05-0.5 equivalent, preferably 0.08-0.3 equivalent per isocyanate group of the organic polyisocyanate to be used in view of the fireproof property and the self-adhesive property to the surface material. When the hydroxyl equivalent is less than 30 as the molecular weight of the polyol, the resulting urethane modified polyisocyanurate foam has a tendency of degrading the friability. On the other hand, when the hydroxyl equivalent exceeds 2000, even if the predetermined urethane modifying ratio is adopted, the amount of the polyol used considerably increases and the flameproofing is apt to be degraded. Similarly, when the urethane modifying ratio of the polyol is outside the above defined range, the friability or flameproofing is apt to be degraded.

In the formation of the core material, there may be used any of well-known isocyanate polymerization catalysts, typical examples of which are as follows:

(1) Tertiary amino compounds, such as dialkylaminoalkyl phenols (e.g., 2,4,6-tris(dimethylaminomethyl) phenol and so on), triethylamine, N,N',N"-tris(dimethylaminoalkyl)-hexahydrotriazines, tetraalkylalkylene diamines, dimethylethanol amine, diazabicyclooctane or its lower alkyl substituted derivatives and the like;

(2) Combinations of tertiary amines with cocatalysts; As the cocatalyst, mention may be made of ethyl alcohol, mono-substituted carbamic acid, esters, aldehydes, alkylene oxides, alkylene imines, ethylene carbonate, 2,3-butanedione and the like.

(3) Tertiary alkyl phosphines;

(4) Alkali metal salts of imides, such as potassium phthalimide and the like;

(5) Onium compounds, such as quaternary onium hydroxyl compounds of nitrogen, phosphorus, arsenic or antimony, onium hydroxyl compounds of sulfur or selenium and the like;

(6) Alkyl substituted ethyleneimines, such as N-methyl ethyleneimine, phenyl-N,N-ethylene urea and the like;

(7) Metal salts of carboxylic acids, such as potassium acetate, potassium 2-ethyl hexanoate, lead 2-ethyl hexanoate, sodium benzoate, potassium naphthenate, potassium caprylate and the like;

(8) Oxides, hydroxides, carbonates, enolic compounds and phenolic compounds of alkali metals or alkaline earth metals;

(9) Epoxy compounds;

(10) Combinations of epoxy compounds with cocatalysts; As the cocatalyst, mention may be made of tertiary amines, metal salts of aromatic secondary amines such as sodium salt of diphenylamine and the like;

(11) Various metal salts, such as stannous octanoate, titanium tetrabutyrate, tributyl antimony oxide and the like;

(12) Friedel-Crafts catalysts, such as aluminum chloride, boron trifluoride and the like; and

(13) Chelate compunds of alkali metals, such as sodium salicylaldehyde and the like.

These catalysts may be used alone or in an admixture thereof, but the alkali metal salt of carboxylic acids having a carbon number of 2-12 or the combination with the tertiary amino compound thereof is preferably used in view of a catalytic activity, a compatibility with the polyol and the like.

The amount of the isocyanate polymerization catalyst used is preferably 0.5-10% by weight per the organic polyisocyanate in view of the catalytic activity.

According to the invention, all of blowing agents used in the production of conventional polyurethane foams and polyisocyanurate foams may be used. For instance, the blowing agent includes carbon dioxide gas generated by adding water to the reaction mixture or supplied from an external source, nitrogen gas and a mixture thereof. However, the preferred blowing agent is a low-boiling inert solvent evaporating by a heat of reaction in the foaming process. Such a solvent is a fluorinated and/or chlorinated hydrocarbon having a good compatibility, a typical example of which includes trichloromonofluoromethane, dichlorodifluoromethane, dichloromonofluoromethane, monochlorodifluoromethane, dichlorotetrafluoroethane, 1,1,2-trichloro-1,2,2-trifluoroethane, methylene chloride, trichloroethane and the like. Further, benzene, toluene, pentane, hexane and so on may be used. These blowing agents may be used alone or in an admixture thereof. Among them, trichloromonofluoromethane is preferable as the blowing agent in view of the foam properties, easiness of foaming and the like.

The addition amount of the blowing agent should be controlled so as to maintain the density of the urethane modified polyisocyanurate foam as the core material at the defined range of 0.02-0.04 g/cm$^3$. For this end, the blowing agent is used in an amount of about 10-40% by weight per foam forming composition though the amount is somewhat dependent upon the kinds of the organic polyisocyanate and polyol, the urethane modifying ratio of the polyol and the like.

In addition to the above mentioned ingredients, a surfactant, a modifying agent and other additives may be added, if necessary.

As the surfactant, use may be made of any ones usually used in the production of polyurethane foams, an example of which includes an organosilicone surfactant such as organopolysiloxane-polyoxyalkylene copolymer, polyalkenyl siloxane having a side chain of polyoxyalkylene and the like. Further, oxyethylated alkyl phenol, oxyethylated aliphatic alcohol, ethylene-propylene oxide block polymer and so on are effective as the surfactant. The surfactant is usually used in an amount of about 0.01–5 parts by weight per 100 parts by weight of the organic polyisocyanate.

As the other additive, there are inorganic hollow particles, granulated refractory, fibrous materials, inorganic fillers and the like, which are used for improving the foam properties such as hardness and the like. The inorganic filler includes mica powder, finely divided clay, asbestos, calcium carbonate, silica gel, aluminum hydroxide, calcium hydroxide, magnesium hydroxide, gypsum, sodium silicate and the like.

Moreover, a flame retardant may be added without deviating the effect of the invention. According to the invention, the flame retardant usually used in the common polyurethane foam and urethane modified isocyanurate foam is effective and includes, for example, halogenated organic phosphorus compounds such as tris(chloropropyl) phosphate, tris(dichloropropyl) phosphate, tris(dibromopropyl) phosphate and the like; and inorganic flame retardant such as antimony oxide and the like.

The front surface material to be piled on the urethane modified polyisocyanurate foam is a three-layer assembly composed of an asbestos layer as an upper layer, a matted or woven glass fiber as a middle layer, and a metal foil having a thickness of less than 0.1 mm as a lower surface, which is united with the core material through the metal foil.

As the asbestos paper, use may be made of any ones commercially available in the market. In general, these asbestos papers are obtained by bonding asbestos fibers with a binder such as pulp, starch, synthetic resin and the like and shping them into a paper by means of a press or the like. Although there are sold various asbestos papers having a thickness of not less than 0.1 mm, according to the invention, it is preferable to use the asbestos paper having a thickness of 0.1–0.5 mm in view of the economic reason and weight-saving.

As the matted or woven glass fiber, there can be used commercially available glass fibers and among them, light-weight matted glass fiber having a thickness of not more than 0.5 mm (sold in the market as a trade name of Surface Mat, Filament Mat or the like) is preferable. The glass fibers having a thicker thickness and a heavier weight are unfavorable in view of the weight-saving and cause somewhat a problem in the adhesive property between the upper and lower layers.

As the metal foil having a thickness of less than 0.1 mm to be used in the lower layer, there are aluminum foil, iron foil, copper foil and the like. Among them, aluminum foil and iron foil are preferable in view of the weight-saving and economic reason.

The front surface material is manufactured by bonding the upper, middle and lower layers one upon the other with a small amount of an adhesive. As the adhesive, use may be made of polyester resins, epoxy resins, urethane resins and the like. Moreover, the bonding of these three layers is effected under pressure, so that the thickness of the middle layer becomes slightly thinner than the original thickness.

According to the invention, the outer surface of the asbestos paper as the front surface material may further be subjected to various decorations by painting, printing and the like if necessary, so as not to damage the fireproof property, or may be covered with a fabricated article previously painted or printed. Further, in order to improve the adhesive property between the metal foil and the core material, a primer or the like may be used so as not to damage the fireproof property.

The back surface material to be used in the invention is preferably an aluminum foil having a thickness of not more than 0.1 mm in view of the economic reason and easiness of processability. When the thickness of the foil exceeds the upper limit, the rigidity of the back surface material becomes higher, so that when the laminate is subjected to JIS A-1321 combustion test, the core material expands toward the heated side (i.e. the front surface material) to produce cracks on the front surface material, which adversely exert on the fireproof property, particularly lingering flame and smoke development.

The reason why the laminates according to the invention have excellent properties as the building material and develop excellent fireproof property and low-smoke development as Grade 2 incombustibility is guessed as follows.

That is, the moisture absorption of the asbestos paper can completely be shut off by laminating the asbestos paper with the glass fiber and the metal foil, so that the dimensional change at moisture absorption of the core material and the decrease of thermal insulating property can be prevented, while the dimensional change of the core material can also physically be prevented by the rigidity of the metal foil. Further, by uniting the metal foil with the core material, the self-adhesive property of the core material to the surface material is improved considerably. Since the metal foil has a good smoothness, the fluidity of the foam forming composition used for the formation of the core material is improved and also an additional effect of making the density of the core material low is obtained.

Referring to the fireproof property, the laminate having only the asbestos paper as the surface material is unacceptable for Grade 2 incombustibility in the surface test according to JIS A-1321 combustion test because conspicuous cracks are formed in the asbestos paper by the decomposition gases generated from the core material and hence the surface of the core material is directly exposed to the flame to cause phenomena such as the increase of fuming quantity, enlargement of lingering flame and the like as previously mentioned. On the contrary, the three-layer assembly composed of the asbestos paper as an upper layer, the matted or woven glass fiber as a middle layer and the metal foil as a lower layer is used as the front surface material, so that when the laminate according to the invention is subjected to JIS A-1321 combustion test, the glass fiber of the middle layer and the metal foil of the lower layer suppress the expansion of the surface material caused by decomposition gases generated from the urethane modified polyisocyanurate foam of the core material and develop the effect of completely preventing the formation of cracks in the surface material and as a result, the combustion of the core material is extremely suppressed. Therefore, the resulting laminates become acceptable for Grade 2 incombustibility of very high level.

The production of the fireproof laminate according to the invention can be carried out by any well-known processes. For instance, the polyol as a urethane modifying agent, catalyst and blowing agent are mixed with stirring by adding a foam stabilizer and other additives, if necessary, to form a homogeneous solution, to which is added the organic polyisocyanate with stirring, whereby a foam forming composition is obtained. Then, the foam forming composition is foamed in a space defined by two metal plates as a surface material so as to form a laminate of a predetermined thickness and bonded thereto through the self-adhesion of the resulting polyisocyanurate foam. Moreover, the polyisocyanurate foam may be bonded to the surface material with an adhesive without damaging the fireproof property. In the latter case, a great care must be taken in the selection of the adhesive.

The fireproof laminates according to the invention have the following characteristics, which have never been provided by the laminates of the prior art.

(a) The front surface material is a three-layer assembly composed of the asbestos paper as an upper layer, the glass fiber as a middle layer and the metal foil of less than 0.1 mm thickness as a lower layer, so that there are also provided laminates having a light weight, an excellent processability and a very high thermal insulating property.

(b) By uniting the front surface material with the core material through the metal foil, the changes with time such as dimensional change at moisture, decrease of thermal insulating property and the like are considerably improved and further the adhesive property between the core material and the surface material is improved, so that the resulting laminate is sufficiently durable in long use time.

(c) In the combination of the core and surface materials, the density of the core material is limited to a range of 0.02–0.04 g/cm$^3$ and the total thickness of the laminate is restricted to not more than 30 mm, whereby the fireproof property of the laminate passes Grade 2 incombustibility according to JIS A-1321 combustion test.

(d) Since the asbestos paper capable of subjecting to a surface treatment such as printing, painting and the like is used as the front surface material, laminates having a rich design are obtained as the building material.

(e) The cost of the front surface material is fairly cheap as compared with the colored steel plate usually used as the surface material.

(f) The laminate having an excellent fireproof property can be provided by starting from the urethane modified polyisocyanurate foam as the core material without adding additives such as flame retardant, inorganic filler and the like, so that the production of such laminates is advantageous in view of the storage stability of the starting material and the production process.

(g) By lying the matted or woven fiber near the interface between the core material and the surface material, the fireproof property is futher improved and also the dimensional stability is improved considerably.

The invention will now be described with reference to the accompanying drawing, wherein:

Single FIGURE is a fragmentary sectional view of an embodiment of the fireproof laminate according to the invention.

The following examples are given in illustration of the invention with comparative examples and are not intended as limitations thereof. In the examples, all parts and percents are by weight, unless otherwise stated.

Moreover, the effect of the invention is decided on a basis of whether or not the laminate passes Grade 2 incombustibility according to JIS A-1321 combustion test. The surface test according to JIS A-1321 is carried out by placing a test piece with a length, width and thickness of 22 cm×22 cm×15–30 mm in a heating furnace and then heating a surface of the test piece for a predetermined period using gas as a sub-heat source and an electric heater as main heat source. Thereafter, the presence and degree of crack/deformation, time of lingering flame after the completion of heating, heat release value (temperature time area, °C.×min.) calculated from the difference between the exhaust temperature curve of the test piece and the reference curve of perlite plate as a standard material, and fuming factor calculated from maximum fuming quantity are measured to judge the fireproof property of the test piece on a basis of acceptable standard values shown in the following Table 1.

Further, the annexed test of the laminate is carried out under the same conditions as described above, except that three holes of 2.5 cm diameter are pierced from front of the test piece to rear side thereof in place. In this case, the evaluation of the term "crack/deformation" is omitted.

TABLE 1

Test
Acceptable standard values of Grade 2
incombustibility (quasi-incombustible material)
according to JIS A-1321 combustion test

| Class | Item | | | |
|---|---|---|---|---|
| | Heat release value (°C. × min.) | Fuming factor | Time of lingering flame (sec.) | Crack/ deformation |
| Surface test | not more than 100 | not more than 60 | not more than 30 | no harmful degree |
| Annexed test | not more than 150 | not more than 60 | not more than 90 | — |

EXAMPLE 1, COMPARATIVE EXAMPLES 1–2

Laminates were manufactured by using urethane modified polyisocyanurate foams made from the compounding recipe of the following Table 2 as a core material.

TABLE 2

| Ingredients | Parts by weight |
|---|---|
| Crude diphenylmethane diisocyanate[1] | 100 |
| Polypropylene glycol[2] | 10.77 |
| Solution of 20 wt. % potassium acetate in dipropylene glycol[3] | 4.0 |
| Dipropylene glycol | 3.2 |
| 2,4,6-tris(dimethylaminomethyl) phenol[4] | 0.5 |
| L-5340[5] | 1.0 |
| Trichloromonofluoromethane[6] | 28 |
| A urethane modifying ratio for isocyanate group is 0.143. | |

Note:
[1]44 V-20 (trade name) made by Sumitomo Bayer Urethane Co., Ltd.; isocyanate equivalent = 137
[2]PP-2000 (trade name) made by Sanyo Kasei Kogyo Co., Ltd.; hydroxyl equivalent = 1,000
[3]The solution is abbreviated as AcOK/DPG hereinafter.
[4]made by Sanyo Boeki Co., Ltd.; hereinafter abbreviated as DMP-30.
[5]organopolysiloxane-polyoxyalkylene copolymer, made by Nippon Unicar Co., Ltd.
[6]The compound is abbreviated as F-11 hereinafter.

The laminate including the urethane modified polyisocyanurate foam as the core material was manufactured as follows.

In an aluminum mold of 40 cm of length and width each was placed a surface material having approximately the same size as that of the mold, and then the mold was heated up to about 38° C. in an oven. Separately, 300 g of the crude diphenylmethane diisocyanate was weighed in a stainless beaker of 0.5 l capacity, while the ingredients other than the above diisocyanate were weighed in a polyethylene beaker of 1 l capacity and thoroughly mixed to form a homegeneous solution. To this solution was added the above diisocyanate and then the resulting mixture was immediately stirred at a high speed for about 6 seconds to obtain a foam forming composition. Then, the composition was cast into the aluminum mold disposing the surface material therein. (In this case, two molds were provided and the composition was sequentially cast into these two molds.) Thereafter, an upper aluminum cover having another surface material at its inner surface was placed on the mold through a spacer of 25 mm thickness and fixed thereto by means of clamp or the like. This assembly was heated in an oven at a temperature of about 50° C. for 15 minutes to effect the curing and then the resulting laminate was taken out from the assembly. In this procedure, there were used surface materials as shown in the following Table 3.

The thus obtained laminate was examined according to JIS A-1321 combustion test to obtain a result relating to the fireproof property of Grade 2 incombustibility as shown in Table 3.

material 5 of an aluminum foil as shown in the single FIGURE.

EXAMPLES 2–3, COMPARATIVE EXAMPLE 3

Laminates having a total thickness of about 25 mm were manufactured in the same manner as described in Example 1 by using the same compounding recipe as shown in Table 2 and the same front and back surface materials as used in Example 1, except that the amount of F-11 was changed so as to change the density of the core material.

In the following Table 4 are shown the amount of F-11, density of core material and evaluation results relating to Grade 2 incombustibility.

TABLE 4

|  |  | Example 2 | | Example 3 | | Comparative Example 3 | |
|---|---|---|---|---|---|---|---|
| Surface material | Front (thickness) | Aspaal W-3310 (0.27 mm) + Surface Mat CFG-08 + Aluminum foil (0.015 mm) | | Aspaal W-3310 (0.27 mm) + Surface Mat CFG-08 + Aluminum foil (0.015 mm) | | Aspaal W-3310 (0.27 mm) + Surface Mat CFG-08 + Aluminum foil (0.015 mm) | |
|  | Back (thickness) | Aluminum foil (0.05 mm) | | Aluminum foil (0.05 mm) | | Aluminum foil (0.05 mm) | |
| JIS-A-1321 combustion test | Amount of F-11 (PHI) | 30 | | 24 | | 17 | |
|  | Class | Surface test | Annexed test | Surface test | Annexed test | Surface test | Annexed test |
|  | Density of core material (g/cm$^3$) | 0.0259 | 0.0252 | 0.0321 | 0.0313 | 0.0415 | 0.0421 |
|  | Heat release value (°C. × min.) | 0 | 0 | 0 | 15.25 | 0 | 37.5 |
|  | Fuming factor | 12.3 | 32.1 | 21.3 | 42.6 | 30.9 | 68.5 |
|  | Time of lingering flame (sec.) | 5 | 27 | 0 | 39 | 0 | 58 |
|  | Crack/deformation | none/small | — | none/small | — | none/small | — |
|  | Judgement | acceptable | | acceptable | | unacceptable | |

*Total thickness of laminate: 25.2–25.9 mm

From the results of Table 4, it can be seen that when the density of the core material is more than 0.04 g/cm$^3$, the resulting laminate becomes unacceptable for Grade 2 incombustibility due to the degradation of fireproof property.

EXAMPLES 4–5, COMPARATIVE EXAMPLE 4

TABLE 3

|  |  | Comparative Example 1 | | Comparative Example 2 | | Example 1 | |
|---|---|---|---|---|---|---|---|
| Surface material | Front (thickness) | Aspaal W-3310[1] (0.27 mm) | | Aluminum foil (0.05 mm) | | Aspaal W-3310 (0.27 mm) + Surface Mat CFG-08[2] + Aluminum foil (0.015 mm) | |
|  | Back (thickness) | Aluminum foil (0.05 mm) | | Aluminum foil (0.05 mm) | | Aluminum foil (0.05 mm) | |
| JIS-A-1321 combustion test | Class | Surface test | Annexed test | Surface test | Annexed test | Surface test | Annexed test |
|  | Density of core material (g/cm$^3$) | 0.0268 | — | 0.0286 | — | 0.0281 | 0.0288 |
|  | Heat release value (°C. × min.) | 15.0 | | 0 | | 0 | 13.75 |
|  | Fuming factor | 79.5 | not measured | 67.2 | not measured | 18.9 | 39.9 |
|  | Time of lingering flame (sec.) | 34 | | 23 | | 0 | 36 |
|  | Crack/deformation | none/middle | | none/small | | none/small | — |
|  | Judgement | unacceptable | | unacceptable | | acceptable | |

Note:
[1]asbestos paper made by Jujo Seishi Co., Ltd.
*Total thickness of laminate: 25.0–25.8 mm
[2], made by Nippon Gaishi Seni Co., Ltd.; thickness: 0.1 mm
In the column "front surface material" of Table 3, A+B+C means a surface material obtained by assembling A as an upper layer, B as a middle layer and C as a lower layer together through an adhesive. As the adhesive, Viron (trade name, made by Toyobo Co., Ltd., polyester resin) was used in a coating thickness of about 0.005–0.01 mm. In each example as mentioned below, the front surface material means the above.

The fireproof laminate of Example 1 comprises a front surface material having a three-layer structure composed of an asbestos paper 1 as an upper layer, a matted glass fiber 2 as a middle layer and an aluminum foil 3 as a lower layer, a core material 4 of urethane modified polyisocyanurate foam, and a back surface Laminates having a different total thickness were manufactured in the same manner as described in Example 1 except that the core material of urethane modified polyisocyanurate foam was made from the compounding recipe as shown in the following Table 5, the thickness of the spacer was changed and the heating temperature of the mold was 60° C.

In the following Table 6 are shown the density of core material, total thickness of laminate and evaluation results relating to Grade 2 incombustibility.

TABLE 5

| Ingredients | Parts by weight |
|---|---|
| Crude diphenylmethane diisocyanate (44V-20) | 100 |
| PP-2000 | 7.57 |
| Solution of 33 wt. % potassium acetate in diethylene glycol[1] | 1.2 |
| Diethylene glycol | 8.8 |
| 2,4,6-tris(dimethylaminomethyl) phenol | 0.5 |
| L-5340 | 1.0 |
| F-11 | 25 |

A urethane modifying ratio for isocyanate group is 0.254.

Note:
[1]The solution is abbreviated as AcOK/DEG hereinafter.

EXAMPLES 6–10

Laminates having a total thickness of about 20 mm were manufactured in the same manner as described in Example 1, except that the kinds of the asbestos paper as the upper layer, the glass fiber as the middle layer and the metal foil as the lower layer constituting the front surface material were changed, respectively and the heating temperature of the mold was 60° C.

In the following Table 7 are shown the surface materials used, density of core material and evaluation results relating to Grade 2 incombustibility.

TABLE 7(a)

| | | Example 6 | | Example 7 | |
|---|---|---|---|---|---|
| Surface material | Front (thickness) | Aspaal W-1100 (0.27 mm)[1] + Surface Mat CFG-08 + Aluminum foil (0.015 mm) | | Aspaal W-3310 (0.27 mm) + Filament Mat MF-30P[2] + Aluminum foil (0.015 mm) | |
| | Back (thickness) | Aluminum foil (0.05 mm) | | Aluminum foil (0.05 mm) | |
| JIS-A-1321 combustion test | Class | Surface test | Annexed test | Surface test | Annexed test |
| | Density of core material (g/cm³) | 0.0281 | 0.0283 | 0.284 | 0.0279 |
| | Heat release value (°C. × min.) | 0 | 0 | 0 | 2.5 |
| | Fuming factor | 9.9 | 34.5 | 10.8 | 32.4 |
| | Time of lingering flame (sec.) | 5 | 28 | 0 | 25 |
| | Crack/deformation | none/small | — | none/small | — |
| | Judgement | acceptable | | acceptable | |

Note:
[1]asbestos paper made by Jujo Seishi Co., Ltd.
[2]made by Nittobo Co., Ltd. thickness: 0.2 mm
[3]made by Nittobo Co., Ltd. thickness: 0.35 mm
Total thickness of laminate: 19.6–20.3 mm

TABLE 6

| | | Example 4 | | Example 5 | | Comparative Example 4 | |
|---|---|---|---|---|---|---|---|
| Surface material | Front (thickness) | Aspaal W-3310 (0.27 mm) + Surface Mat CFG-08 + Aluminum foil (0.015 mm) | | Aspaal W-3310 (0.27 mm) + Surface Mat CFG-08 + Aluminum foil (0.015 mm) | | Aspaal W-3310 (0.27 mm) + Surface Mat CFG-08 + Aluminum foil (0.015 mm) | |
| | Back (thickness) | Aluminum foil (0.05 mm) | | Aluminum foil (0.05 mm) | | Aluminum foil (0.05 mm) | |
| JIS-A-1321 combustion test | Class | Surface test | Annexed test | Surface test | Annexed test | Surface test | Annexed test |
| | Total thickness of laminate (mm) | 19.9 | 19.7 | 25.2 | 25.2 | 32.7 | 32.9 |
| | Density of core material (g/cm³) | 0.0273 | 0.0278 | 0.0277 | 0.0255 | 0.0268 | 0.0270 |
| | Heat release value (°C. × min.) | 0 | 13.75 | 0 | 16.25 | 12.5 | 31.25 |
| | Fuming factor | 2.7 | 34.2 | 2.1 | 37.2 | 35.4 | 65.4 |
| | Time of lingering flame (sec.) | 0 | 22 | 0 | 29 | 7 | 44 |
| | Crack/deformation | none/small | — | none/small | — | none/small | — |
| | Judgement | acceptable | | acceptable | | unacceptable | |

TABLE 7(b)

| | | Example 8 | | Example 9 | |
|---|---|---|---|---|---|
| Surface material | Front (thickness) | Aspaal W-3310 (0.27 mm) + Filament Mat MF-60P[3] + Aluminum foil (0.015 mm) | | Aspaal W-3310 (0.27 mm) + Surface Mat CFG-08 + Aluminum foil (0.05 mm) | |
| | Back (thickness) | Aluminum foil (0.05 mm) | | Aluminum foil (0.05 mm) | |
| JIS-A-1321 combustion test | Class | Surface test | Annexed test | Surface test | Annexed test |
| | Density of core material (g/cm³) | 0.0280 | 0.0284 | 0.0277 | 0.0277 |
| | Heat release value (°C. × min.) | 0 | 3.75 | 0 | 0 |
| | Fuming factor | 1.8 | 39.0 | 2.4 | 28.5 |
| | Time of lingering flame (sec.) | 0 | 12 | 0 | 31 |
| | Crack/deformation | none/small | — | none/small | — |

TABLE 7(b)-continued

|  | Example 8 | Example 9 |
|---|---|---|
| Judgement | acceptable | acceptable |

Note:
[1] asbestos paper made by Jujo Seishi Co., Ltd.
[2] made by Nittobo Co., Ltd. thickness: 0.2 mm
[3] made by Nittobo Co., Ltd. thickness: 0.35 mm
Total thickness of laminate: 19.6–20.3 mm

TABLE 7(c)

|  |  | Example 10 |
|---|---|---|
| Surface material | Front (thickness) | Aspaal W-3310 (0.27 mm) + Surface Mat CFG-08 + Iron foil (0.05 mm) |
| | Back (thickness) | Aluminum foil (0.05 mm) |

| JIS-A-1321 combustion test | Class | Surface test | Annexed test |
|---|---|---|---|
| | Density of core material (g/cm³) | 0.0289 | 0.0287 |
| | Heat release value (°C. × min.) | 0 | 16.25 |
| test Fuming factor | 3.3 | 39.6 | |
| | Time of lingering flame (sec.) | 0 | 21 |
| | Crack/deformation | none/small | — |
| | Judgement | acceptable | |

EXAMPLES 11–13

Laminates having a total thickness of about 20 mm were manufactured in the same manner as described in Example 1, except that the core material of urethane modified polyisocyanurate foam was made from the compounding recipe as shown in the following Table 8.

In Table 8 are shown the compounding recipe, urethane modifying ratio for isocyanate group, density of core material and evaluation results relating to Grade 2 incombustibility.

TABLE 8(a)

|  |  | Example 11 | | Example 12 | | Example 13 | |
|---|---|---|---|---|---|---|---|
| Surface material | Front (thickness) Back | Aspaal W-3310 (0.27 mm) + Surface Mat CFG-08 + Aluminum foil (0.015 mm) Aluminum foil | | Aspaal W-3310 (0.27 mm) + Surface Mat CFG-08 + Aluminum foil (0.015 mm) Aluminum foil | | Aspaal W-3310 (0.27 mm) + Surface Mat CFG-08 + Aluminum foil (0.015 mm) Aluminum foil | |
| Compounding recipe (part by weight) | | Crude diphenylmethane diisocyanate (44V-20) | 100 | Crude diphenylmethane diisocyanate (44V-20) | 100 | Crude diphenylmethane diisocyanate (44V-20) | 100 |
| | | PP-2000 | 7.57 | PP-2000 | 13.97 | PP-400[2] | 10.03 |
| | | AcOK/DEG | 1.2 | AcOK/DPG | 4.0 | G-300[3] | 2.77 |
| | | Diethylene glycol | 8.8 | 2,4,6-tris-(dimethylaminomethyl)phenol | 2.0 | AcOK/DEG | 2.4 |
| | | N,N',N''-tris-(dimethylaminopropyl)-sym-hexahydrotriazine[1] | 0.5 | F-11 | 28 | N,N-dimethylethanolamine | 0.5 |
| | | L-5340 | 1.0 | | | SH-193[4] | 1.5 |
| | | F-11 | 25 | | | F-11 | 26 |
| Urethane modifying ratio | | 0.254 | | 0.083 | | 0.143 | |

Note:
Total thickness of laminate: 19.2–21.3 mm
[1] made by Abbott Laboratories, Polycat 41 (tradename)
[2] made by Sanyo Kasei Kogyo Co., Ltd.; polypropylene glycol, hydroxyl equivalent = 200
[3] made by Asahi Denka Kogyo Co., Ltd.; addition polyol product of glycerin with propylene oxide, hydroxy equivalent = 100
[4] made by Toray Silicone Co., Ltd.; organosiloxane-polyoxyalkylene copolymer

TABLE 8(b)

|  |  | Example 11 | | Example 12 | | Example 13 | |
|---|---|---|---|---|---|---|---|
| | | Surface test | Annexed test | Surface test | Annexed test | Surface test | Annexed test |
| JIS-A-1321 combustion test | Class Density of core material (g/cm³) | 0.0270 | 0.0279 | 0.0289 | 0.0293 | 0.0307 | 0.0305 |
| | Heat release value (°C. × min.) | 0 | 17.5 | 3.75 | 21.25 | 0 | 0 |
| | Fuming factor | 18.3 | 34.2 | 21.6 | 37.2 | 4.8 | 41.7 |
| | Time of lingering flame (sec.) | 3 | 20 | 11 | 19 | 0 | 35 |
| | Crack/deformation | none/small | — | none/small | — | none/small | — |
| | Judgement | acceptable | | acceptable | | acceptable | |

Total thickness of laminate: 19.2–21.3 mm

What is claimed is:

1. A fireproof laminate comprising a urethane modified polyisocyanurate foam as a core material and surface materials piled on both sides of the foam and having a fireproof property which passes Grade 2 incombustibility according to Japanese Industrial Standard A-1321 combustion test, which comprises:

(a) a three-layer assembly composed of an asbestos paper as an upper layer, a matted or woven glass fiber as a middle layer and a metal foil having a thickness of less than 0.1 mm as a lower layer as a front surface material for said core material, said front surface material being united with said core material through said metal foil by self-adhesion of said foam;

(b) an aluminum foil having a thickness of not more than 0.1 mm as a back surface material for said core material;
(c) said core material being rigid and produced by reacting an organic polyisocyanate with a polyol having a hydroxyl equivalent of 30 to 2,000 in an amount of 0.05 to 0.5 equivalent per isocyanate group of said organic polyisocyanate in the presence of an isocyanate polymerization catalyst selected from the group consisting of (i) an alkali metal salt of a carboxylic acid having 2 to 12 carbon atoms and (ii) said alkali metal carboxylic acid salt and a combination of tertiary amino compound therewith, a blowing agent and if necessary, other additives, and having a density of 0.02-0.04 g/cm$^3$ and
(d) said laminate having a total thickness of not more than 30 mm.

2. A fireproof laminate as claimed in claim 1, wherein said metal foil as the lower layer of said front surface material is an aluminum foil.

3. A fireproof laminate as claimed in claim 1, wherein said polyol is a compound having two or more hydroxyl groups at its terminal.

4. A fireproof laminate as claimed in claim 1, wherein said alkylene oxide is ethylene oxide or propylene oxide.

5. A fireproof laminate as claimed in claim 1, wherein said organic polyisocyanate is an aromatic polyisocyanate.

6. A fireproof laminate as claimed in claim 1, wherein said organic polyisocyanate is a mixture of polymethylenepolyphenyl isocyanates having the following formula

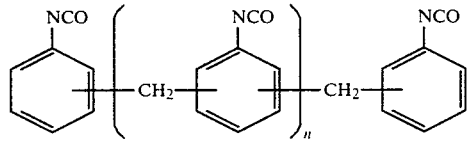

wherein n is 0 or an integer of 1 or more.

7. A fireproof laminate as claimed in claim 1, wherein said alkali metal salt of said carboxylic acid is selected from the group consisting of potassium acetate, potassium 2-ethyl hexanoate, lead 2-ethyl hexanoate, sodium benzoate, potassium naphthenate and potassium caprylate.

8. A fireproof laminate as claimed in claim 1, wherein the tertiary amino compound is selected from the group consisting of dialkylaminoalkyl phenols triethylamine, N,N',N''-tris-(dimethylaminoalkyl)-hexahydrotriazines, tetraalkylalkylene diamines, dimethylethanol amine and diazabicyclooctane or its lower alkyl substituted derivatives.

9. A fireproof laminate as claimed in claim 1, wherein said isocyanate polymerization catalyst is used in an amount of 0.5-10% by weight of said organic polyisocyanate.

10. A fireproof laminate as claimed in claim 1, wherein said blowing agent is a low-boiling inert organic compound.

11. A fireproof laminate as claimed in claim 1, wherein said blowing agent is trichloromonofluoromethane.

12. A fireproof laminate as claimed in claim 1, wherein said blowing agent is used in an amount of 10-40% by weight of the foam forming composition of said core material.

13. A fireproof laminate as claimed in claim 3, wherein said polyol is selected from the group consisting of a polyhydric alcohol; an addition product of a polyhydric alcohol with an alkylene oxide; an addition product of a polyamine with an alkylene oxide; an addition product of phosphoric acid with an alkylene oxide; an addition product of a phenol with an alkylene oxide; and an addition product of an intermediate having a phenolic hydroxyl group with an alkylene oxide.

14. A fireproof laminate as claimed in claim 13, wherein said polyhydric alcohol is selected from the group consisting of ethylene glycol, propylene glycol, butylene glycol, hexylene glycol, diethylene glycol, dipropylene glycol, glycerine, hexane triol, pentaerythritol, trimethylol propane, methyl glucoside, sorbitol and sucrose.

15. A fireproof laminate as claimed in claim 13, wherein said polyamine is selected from the group consisting of ammonia, ethylene diamine, diethylene triamine and tolylene diamine.

16. A fireproof laminate as claimed in claim 13, wherein said intermediate having a phenolic hydroxyl group is selected from the group consisting of a novolac resin and a resole resin.

17. A fireproof laminate as claimed in claim 12, wherein said dialkylaminoalkyl phenol is 2,4,6-tris(-dimethylaminomethyl) phenol.

* * * * *